Dec. 9, 1952 P. W. McLANE 2,620,772
VARIABLE RATIO BOOSTER
Filed March 4, 1949 3 Sheets-Sheet 1

INVENTOR.
PHILIP W. McLANE
BY George Sullivan
Agent

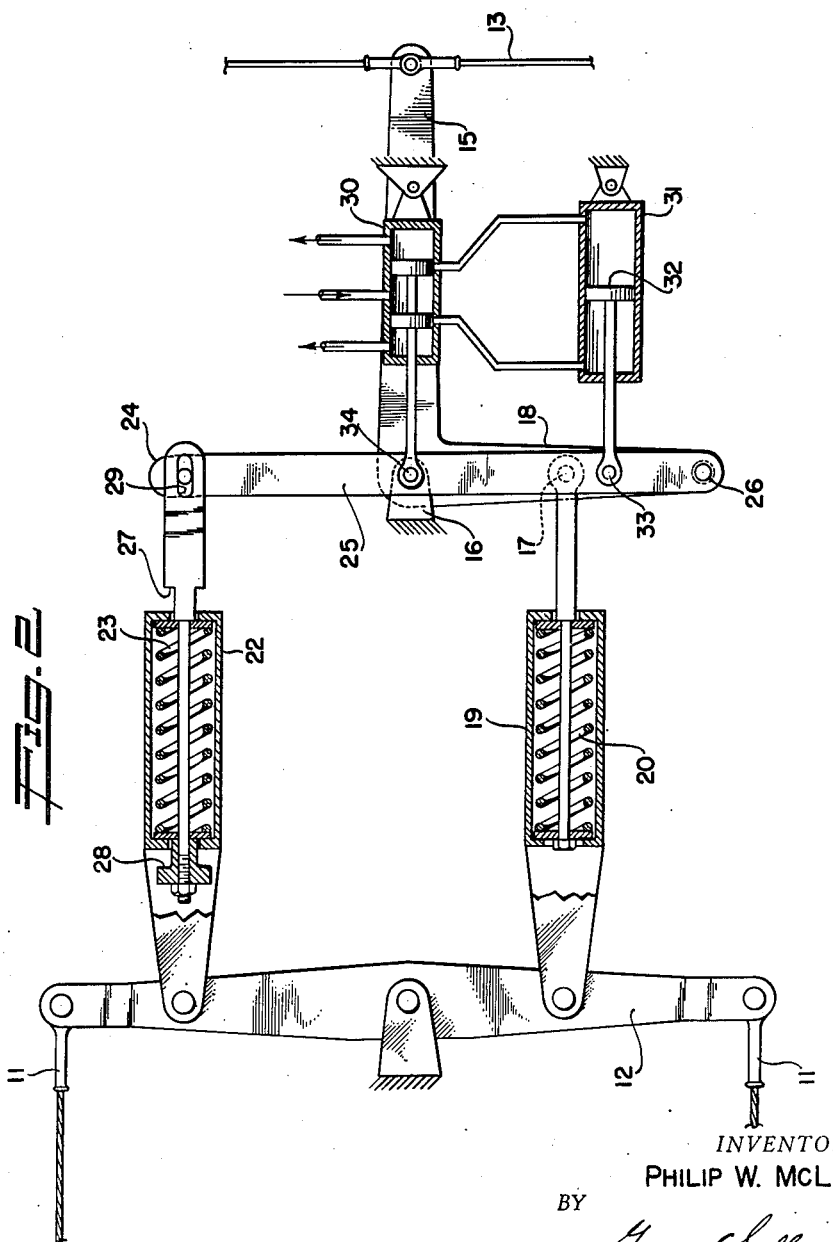

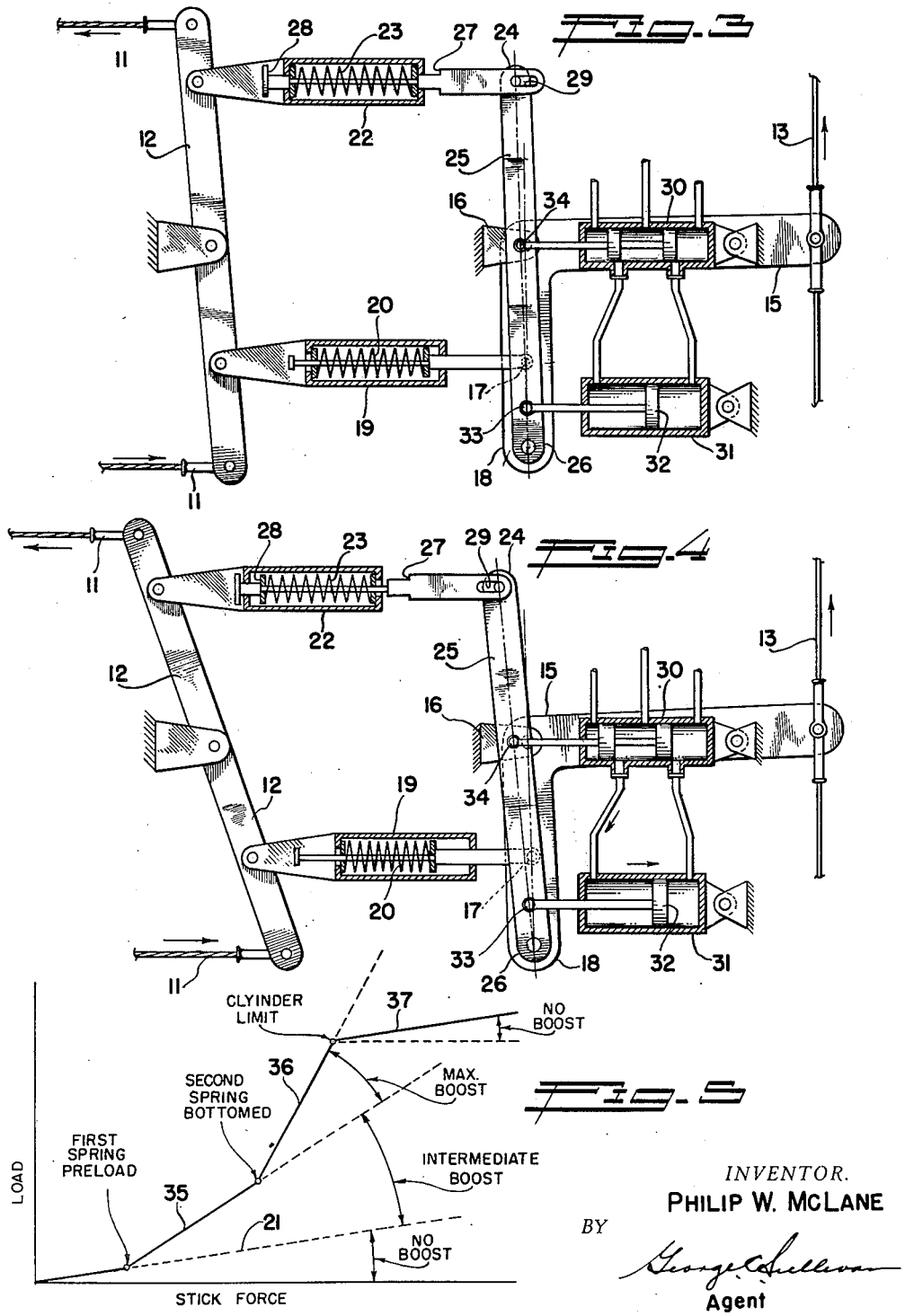

Patented Dec. 9, 1952

2,620,772

UNITED STATES PATENT OFFICE 2,620,772

VARIABLE RATIO BOOSTER

Philip W. McLane, Roscoe, Calif., assignor to Lockheed Aircraft Corporation, Burbank, Calif.

Application March 4, 1949, Serial No. 79,634

5 Claims. (Cl. 121—41)

This invention relates to variable ratio power boosters for operating aerodynamic control surfaces of large and/or high speed aircraft wherein the control surface loads at times greatly exceed the physical ability of the pilot to manipulate the same.

It has heretofore been found desirable to provide boosters, as distinguished from servo-mechanisms, wherein the pilot must exert or sustain a selected proportion of the load or the control surface, in order to sense or feel the loads imposed thereon during aerodynamic maneuvers. Also, the system must be reversible in order to feed back such a feel to the pilot. Such proportional systems are disclosed, for example, in the patent Pearsall et al., No. 2,389,274, and the application of R. R. Richolt, Serial No. 658,625, filed April 1, 1946, now Patent No. 2,591,871. These latter systems are satisfactory at normal operational speeds but become unsatisfactory at each end of the range. At low aerodynamic loads the manual portion of the load giving the feel may be less than the inherent friction in the manually operated part of the mechanism, in which case the boost system becomes irreversible, i. e., not responsive to the aerodynamic load. At critical Mach number speeds, as in the transonic and supersonic speed ranges, the aerodynamic load builds up rapidly and sometimes suddenly, and exceeds the booster power that can be developed by the pilot at fixed boost ratios forming a satisfactory compromise between these limits. Increasing the boost ratio raises the threshold speed and load at which the booster system becomes reversible, i. e., feeds back a portion of the aerodynamic load to the pilot.

It is accordingly an important object of this invention to provide an automatically variable ratio booster system to insure the maintenance of adequate control of an airplane during transonic and supersonic flight regimes while providing a sensitive and ideal control at lower speeds where the aerodynamic loads are so light that little or no boost is desirable in order that the pilot may fully sense the load reactions. For convenience, I will call my improved booster variable ratio a progressive ratio in that at low loads no boost may be necessary or desirable, and the desired boost ratio may be gradually built up to handle the maximum loads the airplane is stressed for without stiffening up the pilot's manual control mechanism.

It is a further object of this invention to provide an improved control surface booster system of the type described embodying a progressive boost ratio wherein at very light loads the control surface will move in substantial synchronization with the pilot's control stick or wheel, to develop full surface deflection with full stick movements; whereas, at very high loads the boost ratio increase will result in much less surface movement in response to a given pilot's control movement. It will be understood that normally the control surfaces will be moved through their full range only under static or taxi conditions, whereas, at extreme speeds and the resulting aerodynamic loads calling for the maximum boost ratio, the control surface movements can only be slight without exceeding the design stress factors of the surfaces and the airplane itself.

It is a further object of this invention to provide a variable ratio boost system of the type described, the reversibility of which is not limited by booster imposed loads other than those induced by pilot resistance.

Other and further objects and advantages of my invention will become apparent as the detailed description thereof proceeds. While my invention is readily applicable to any or all of the major control surfaces or mechanisms of an airplane or other device, I have chosen its application to the operation of airplane ailerons to illustrate one embodiment thereof in the accompanying drawings.

Figure 2 is a plan view of the booster of Figure 1 in its neutral or central position, parts being broken away to illustrate the structure thereof;

Figure 3 is a plan view corresponding to Figure 2 wherein the operation of the device at no boost is illustrated;

Figure 4 is a corresponding view illustrating the operation of the device at an intermediate boost ratio; and Figure 5 is a schematic chart illustrating the progressively increasing boost ratios that can be tailored to meet the operating characteristics and loads of a given airplane and control surface design.

Figure 1:
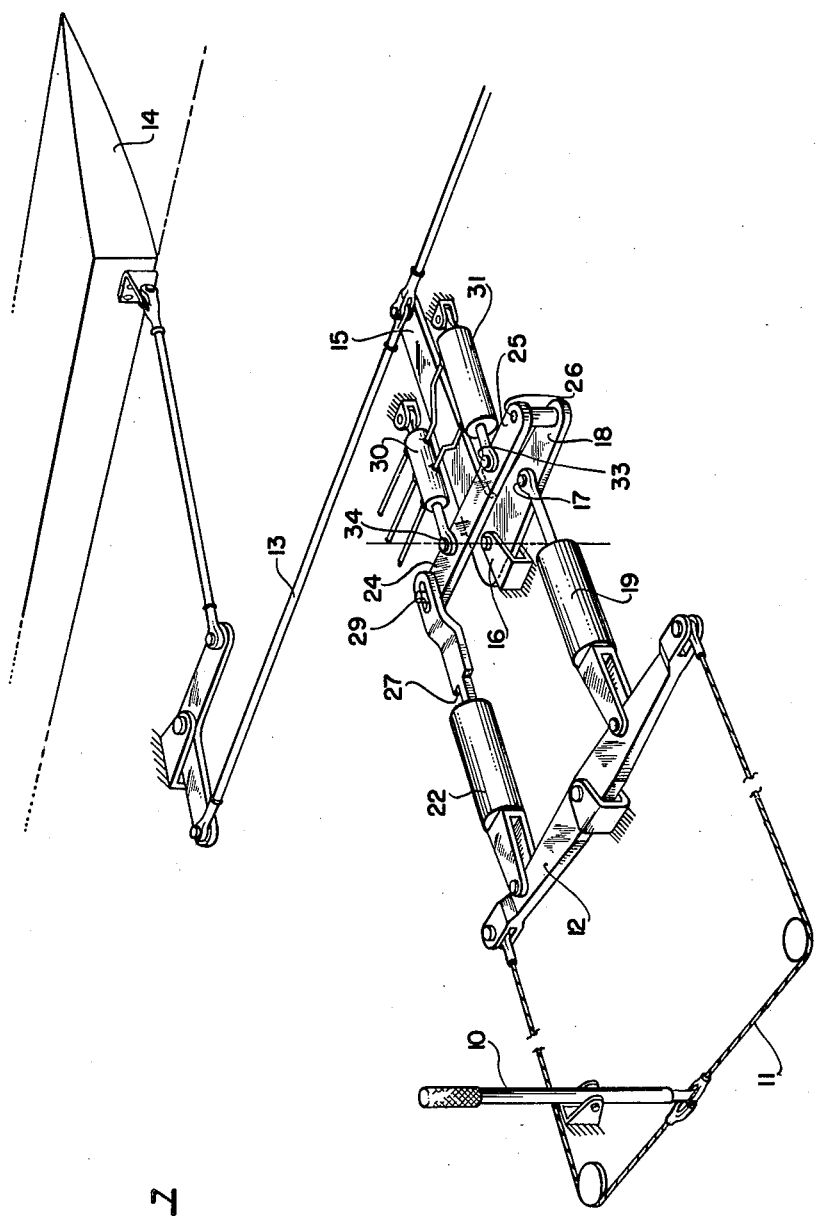
Figure 1 is a perspective view of an aileron booster system embodying the features of my invention.

As shown in the drawings, the booster system of this invention is interposed between a pilot operated control stick 10, cable system 11 and walking beam 12, and linkage 13 extending to ailerons 14, only one of which is shown, although it will be understood that a pair of such ailerons are normally operated simultaneously in opposite directions of deflection. The linkage 13 is operated by a bell crank lever 15 pivoted at 16, the bell crank also being capable of serving directly as an elevator or rudder horn in the event the booster system is applied to such controls, as in the Richolt patent mentioned. Duplicate booster systems could also be applied direct to each aileron, instead of operating both ailerons from one booster, but such an arrangement would increase the complexity and friction load in the pilot operated part of the system.

The walking beam 12 is directly connected at 17 to an arm 18 of the bell crank lever 15 by means of a yielding link 19 containing a double acting preloaded spring 20; the arrangement being such that the link is rigid in either tension or compression up to the preselected preload set in the spring, above which preload the link will yield in response to either tension or compression. It will be noted that up to the preload point the walking beam 12 will produce equivalent angular motion in the bell crank lever 15 and thus directly actuate the ailerons under conditions of zero boost wherein the pilot takes the entire friction and air loads in the control system. This "no boost" range is represented by the solid and dotted line 21 in Figure 5.

A second yielding link 22, also containing a preloaded spring 23, is arranged between the walking beam 12 and one end 24 of a feel lever 25 pivoted to the bell crank lever 15 at 26. This link 22 is distinguished from the link 19 in that it has shoulders or stops 27 and 28 positively limiting the range of compression and stretching. The link 22 has a slot 29 engaging a pin in the end 24 of the feel lever which slot gives only sufficient lost motion in the connection to crack open a hydraulic valve 30 in either direction to suitably energize a hydraulic power cylinder 31 to cause a piston 32 therein pivoted to the feel lever at 33 to follow the movement of the lever 15 under no boost operation.

The hydraulic valve 30 is pivoted to the feel lever 25 at 34, in direct axial alignment with the bell crank lever pivot 16 when the system is in neutral as shown in Figures 1 and 2. Movement of the feel lever 25 to carry its pin end 24 to either extreme of the slot 29 serves to crack open the valve 30 as shown in Figure 3. When the valve 30 is closed the hydraulic cylinder 31 is hydraulically locked so that under such circumstances the feel lever 25 will momentarily pivot about the piston connection 33 when the bell crank lever 15 is moved by the pilot under no boost conditions as previously described. This pivotal movement will be only sufficient to crack open the valve 30 to cause the boost system to follow the bell crank lever 15 without adding power to the system until the preloaded spring in the link 19 begins to compress. When the link 19 begins to stretch or compress, some power will be added as the upper link 22 begins to pull or push on the pin end 24 of the feel lever to further open the valve 30. This added or intermediate power boost is represented by the line 35 in Figure 5 which is superimposed or added to the "no boost" line, and continues until one of the stops 27 or 28 on the upper spring link 22 bottoms, whereupon further pilot effort calls for the maximum power boost represented by the line 36 superimposed in the intermediate boost line in Figure 5; this high boost continuing to the limit of the power available from the hydraulic cylinder 31. The maximum boost ratio obtainable is determined by the position of the hydraulic piston pivot 33 relative to the ends 24 and 26 of the feel lever 25 and can be tailored to the maximum permissible air loads permitted by structural stress considerations. Thereafter any added force exerted by the pilot will be under "no boost" conditions superimposed on the maximum boost, as indicated by the line 37 in Figure 5.

During the progressive boost ratio stages above described the feel lever 25 will normally be displaced in one direction or the other by pilot manual forces imposed thereon, which lever movement will be followed by power boost forces acting to restore the feel lever to its neutral point, while at the same time further deflecting the lever 15 until the resulting forces become balanced against each other at the point of application of their combined forces acting on the bell crank lever at 18. The reverse flow of forces derived from air loads on the control surface or aileron acts through the pivot point 18 to energize the booster and transmit a feel to the pilot through the links 19 and 22 to the walking beam 12, the division of forces depending on whether the pilot resists such reversal. If he does not oppose such air loads, the reverse movement may be accomplished without boost, or at a low boost ratio which is merely that necessary to overcome the inherent mechanical friction of the entire system. Accordingly, the control surfaces themselves are completely reversible and restore to a neutral position at a favorable reverse boost ratio unless the pilot chooses to resist such movement. This characteristic is important to avoid stiffness and porpoising or oscillation of the control surfaces.

The operation of my variable boost ratio system can best be understood by reference to Figures 3 and 4 which respectively illustrate "no boost" and intermediate boost ratios wherein the pilot is imposing counterclockwise motion on the walking beam 12.

In the no boost condition of Figure 3, the pilot's force is being transmitted directly to the bell crank lever 15 through the spring link 19 and the pin in the upper end 24 of the feel lever is floating in the slot 29 of the second link 22 under the influence of a force from the lever 15 acting at the lower end 26 of the feel lever 25 to cause the latter to pivot about the hydraulic piston pivot point 33, thus cracking the valve 30 open sufficiently to cause the hydraulic piston to follow the movement of the bell crank lever. Under these conditions the lever 15 operates substantially in phase with the walking beam 12 so that full stick movement produces full control surface response and vice versa. Any compression of the spring in link 19 causes a corresponding lag in the extent of movement of the control surface; and boost force is progressively added to the system when the upper spring link 22 begins to transmit force to the upper end of the feel lever.

For the same direction of motion as before, Figure 4 shows an intermediate stage in boost ratio wherein the spring in the upper link 22 has been partly compressed and is therefore exerting a pull at 24, the upper end of the feel lever 25. Such a pull induces further opening of the valve 30 so that the hydraulic piston 32 begins to apply more power at its pivot 33 on the lever 25, this force being transmitted to the pivot point 18 of the bell crank lever 15 until sufficient movement thereof occurs to recenter the valve 30. The feel lever 25 then balances the force at 25 and its lever arm against the piston force at 33 about its lever arm, both forces being additive against the bell crank lever 15. This power boost effect is at the desired maximum boost ratio and in turn is added to the portion of the pilot's force mechanically transmitted direct to the bell crank lever 15 through the lower link 19. The result is that as the pilot's effort and stick movement increase for a given control surface deflection, the proportion of boosted power in the total force applied to the control surface increases to, in effect, give a progressively increasing over-all boost ratio that can be designed for a very high maximum boost ratio on the order of 100 to 1 or more without affecting the sensitivity and reversibility of the controls at relatively light loads in the sub-sonic speed range.

Having thus described my invention and the present preferred embodiments thereof, I desire to emphasize the fact that many modifications may be resorted to in a manner limited only by a just interpretation of the following claims.

I claim:

1. In a control mechanism of the class described, including a movable element adapted to be controlled, a manually operable control mechanism therefor, and a power booster comprising motor means and a control therefor to supplement the manually operable control mechanism in operating said movable element, the combination of a yielding direct mechanical connection between the manually operable control mechanism and the movable element so constructed and arranged as to directly operate the movable element at light loads, and another yielding connection between said manually operable control mechanism and the control for said power booster, so constructed and arranged as to progressively energize power booster upon yielding of said connections, whereby the power booster progressively supplies an increasing proportion of the total force applied to the movable element as the loads thereon increase.

2. In a control mechanism of the class described, including a movable element adapted to be controlled, a manually operable control mechanism therefor and a power booster comprising a motor means and a control therefor, means connecting said manually operable control mechanism and said power booster motor means and control to said movable element, said means being so constructed and arranged as to provide for operation of the movable element by either the manually operable control mechanism alone or in parallel with the power booster, and means interconnecting the manually operable control mechanism and said movable element including a preloaded yieldable link directly connected between said manually operable control mechanism and said movable element whereby the yielding of said link is adapted to progressively increase the proportion of the load carried by said power booster through said first mentioned connecting means.

3. In a control mechanism of the class described, including a movable element adapted to be controlled, a manually operable control mechanism therefor and a power booster mechanism adapted to aid said manually operable control mechanism in operating said movable element under high load conditions thereon, the combination of a first yielding connection between said manually operable control mechanism and movable element for the direct mechanical operation of said element under light loads transmitted through said connection, a feel lever associated with said power booster mechanism and adapted to energize the same, a second yielding connection between said manually operable control mechanism and said feel lever, and means so constructed and arranged as to progressively apply manual loads exceeding that transmitted by the first yielding connection to said feel lever whereby to progressively increase the power booster force applied to said movable element as the loads thereon increase.

4. In a control mechanism of the class described, a movable element subject to widely variable loads, a manual control mechanism therefor having a preloaded yieldable connection to said movable element whereby the movable element will move in phase with movement of the manual control mechanism at loads below the preload in said yieldable connection, a hydraulic power booster including a feel lever having a lost motion connection at one end to said manual control mechanism and a connection at the other end to said movable element, a booster cylinder linked to said feel lever intermediate its ends, and a control valve for said booster cylinder also linked to said feel lever and so arranged as to energize said cylinder upon taking up the lost motion in the connection of the feel lever to the manual control mechanism.

5. In a control mechanism of the class described, a movable element subject to widely variable loads, a manual control mechanism therefor having a preloaded yieldable connection to said movable element whereby the movable element will move in phase with movement of the manual control mechanism at loads below the preload in said yieldable connection, a hydraulic power booster including a feel lever having a preloaded yielding link at one end to said manual control mechanism and a connection at the other end to said movable element, a booster cylinder linked to said feel lever intermediate its ends, and a control valve for said booster cylinder also linked to said feel lever and so arranged as to energize said cylinder upon relative movement in the preloaded yielding link of the feel lever to the manual control mechanism.

PHILIP W. McLANE.

REFERENCES CITED

The following references are of record in the file of this patent:

UNITED STATES PATENTS

| Number | Name | Date |
|---|---|---|
| 1,365,347 | Schneider | Jan. 11, 1921 |
| 1,869,698 | Komfala | Aug. 2, 1932 |
| 2,215,423 | Heftler et al. | Sept. 17, 1940 |
| 2,284,298 | Newton | May 26, 1942 |
| 2,337,706 | Berry | Dec. 28, 1943 |
| 2,366,382 | Burton et al. | Jan. 2, 1945 |
| 2,380,705 | Proctor | July 31, 1945 |
| 2,424,901 | Richolt | July 29, 1947 |

FOREIGN PATENTS

| Number | Country | Date |
|---|---|---|
| 130,213 | Great Britain | July 31, 1919 |
| 747,960 | France | Apr. 4, 1933 |